Aug. 23, 1938.　　　W. C. PFEIFFER　　　2,127,750
AUTOGRAPHIC REGISTER
Filed Feb. 5, 1936　　　5 Sheets-Sheet 1

FIG. 1.

WILLIAM C. PFEIFFER, Inventor
Toulmin & Toulmin
Attorneys

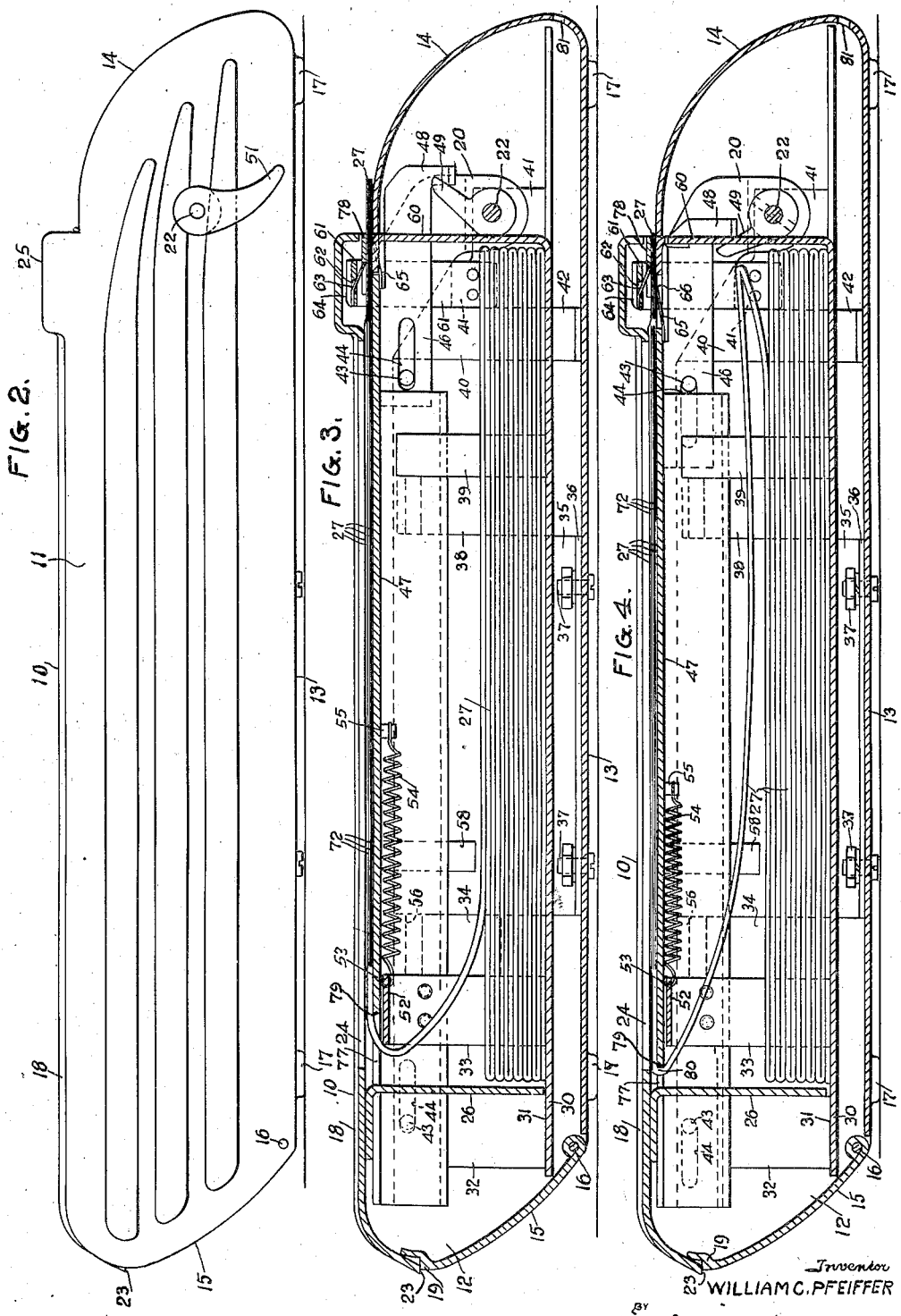

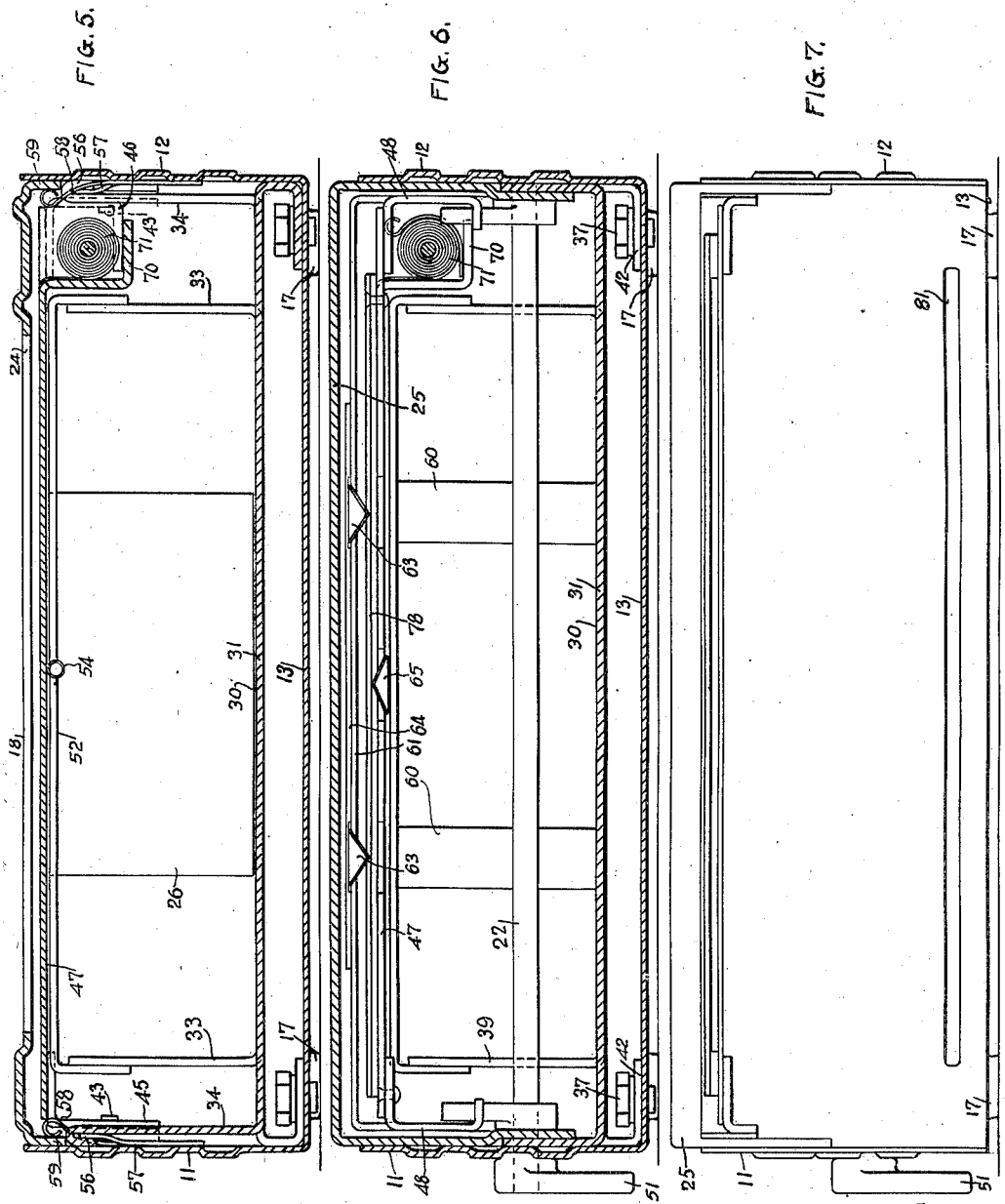

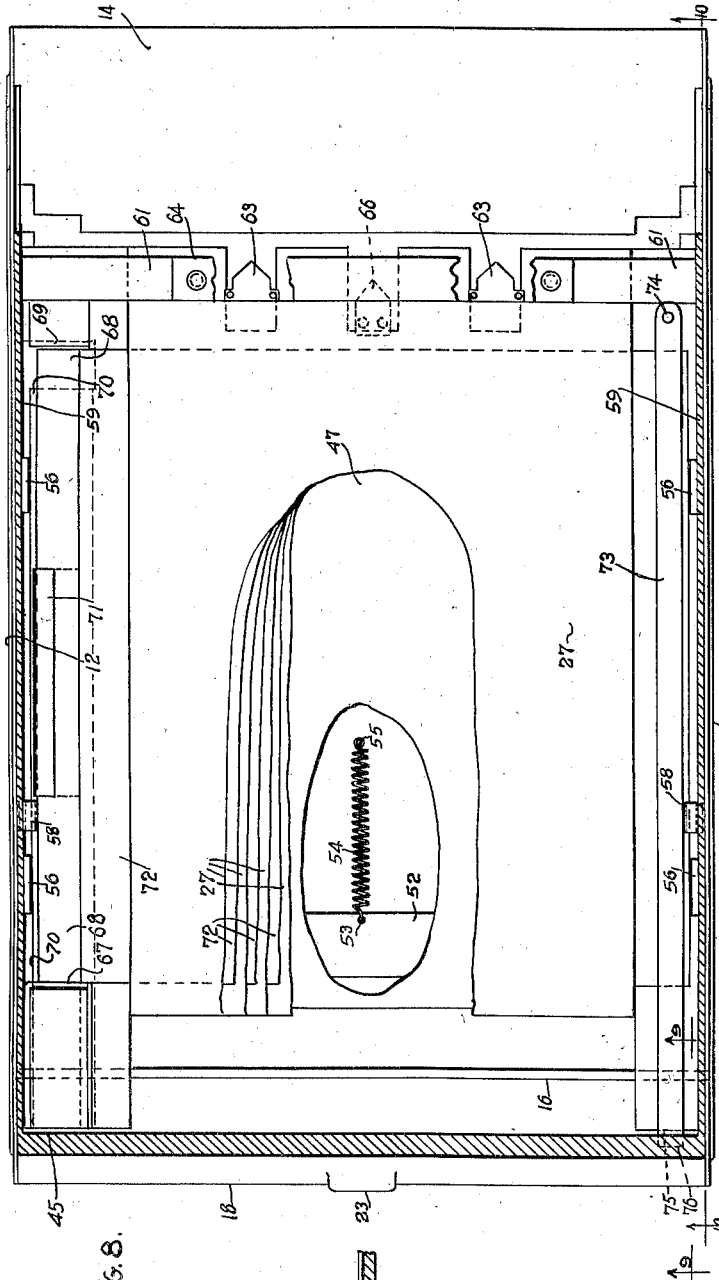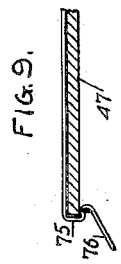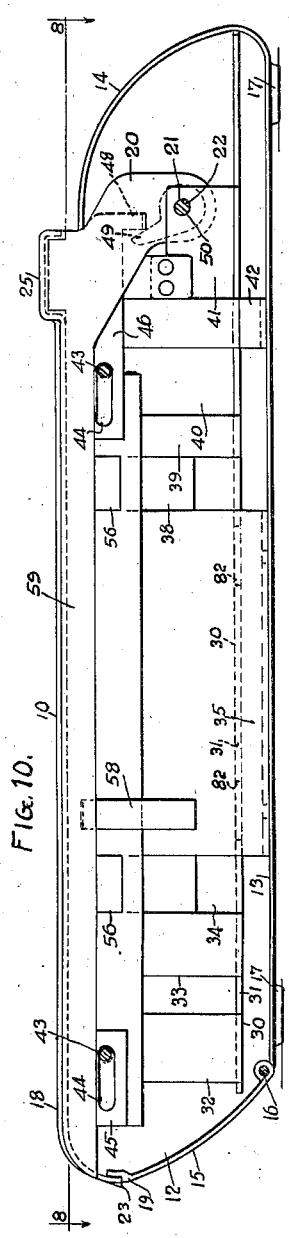

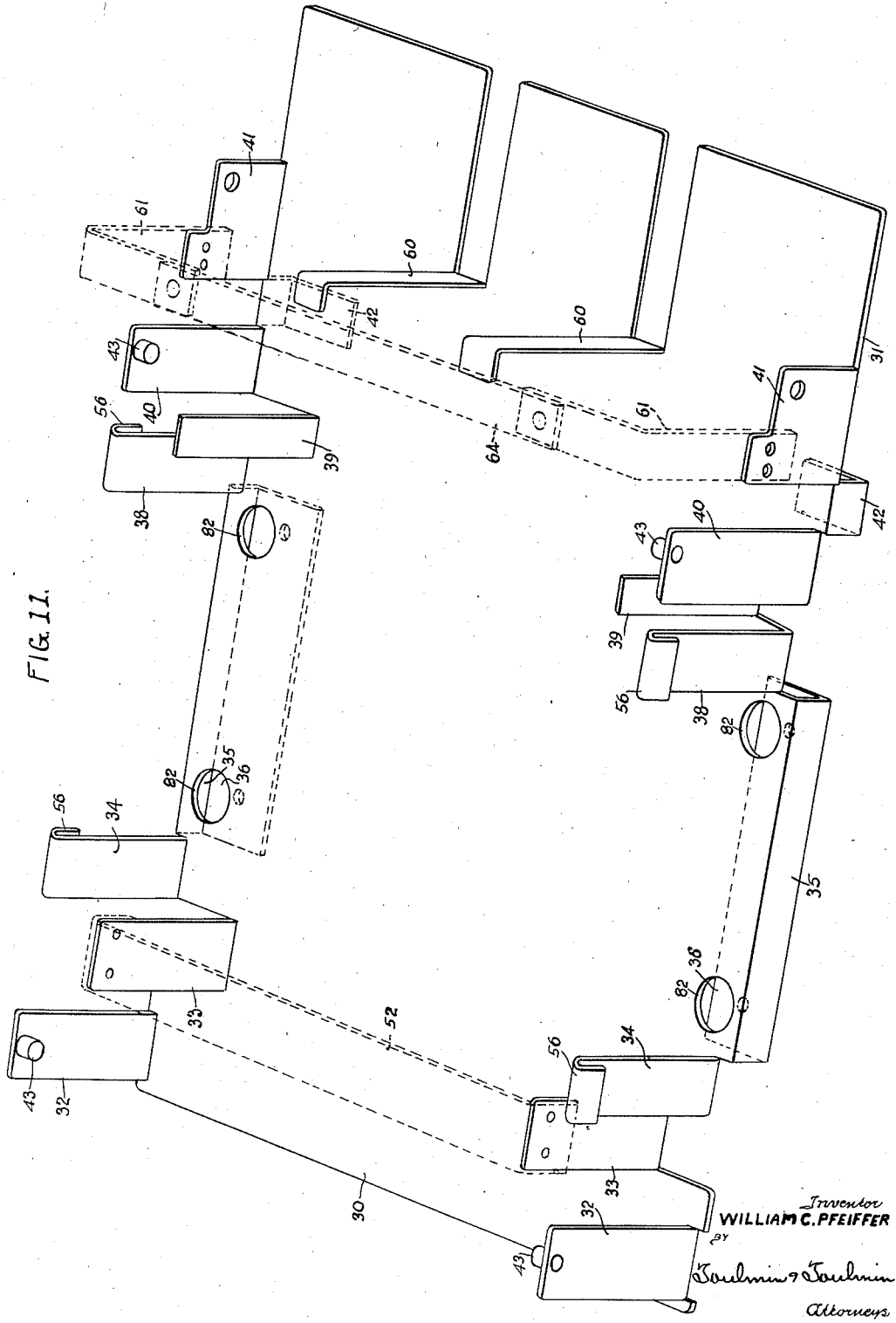

Patented Aug. 23, 1938

2,127,750

UNITED STATES PATENT OFFICE 2,127,750

AUTOGRAPHIC REGISTER

William C. Pfeiffer, Dayton, Ohio, assignor to The Egry Register Company, Dayton, Ohio, a corporation of Ohio Application February 5, 1936, Serial No. 62,462

10 Claims. (Cl. 282—21)

This invention relates to autographic registers, and in particular, to devices for ejecting the paper from an autographic register after the inscription has been made thereon.

One object of this invention is to provide an autographic register having means for moving the paper forwardly from the writing position so that it may be readily grasped by the operator, withdrawn and torn off along the desired line.

Another object of this invention is to provide an autographic register wherein the paper pack is arranged in zigzag form with carbon sheets interleaved between the various paper webs, the whole being carried by a movable table associated with means whereby the table may be moved forwardly to advance the paper after the writing operation, after which the table returns to its normal position, leaving the edges of the paper webs exposed where they may be grasped by the operator and withdrawn from the machine.

Another object of the invention is to provide such an autographic register, as hereinafter described, wherein means is provided for resisting the backward motion of the paper webs while the table is moving backwardly after the paper webs have been partly ejected from the machine, in the manner described above.

In the drawings:

Figure 1 is a top plan view of the autographic register of this invention.

Figure 2 is a side elevation thereof.

Figure 3 is a longitudinal section along the line 3—3 of Figure 1, showing the ejecting apparatus in its advanced position.

Figure 4 is a view similar to Figure 3, but showing the ejecting apparatus in its retracted position.

Figure 5 is a cross section along the line 5—5 of Figure 1.

Figure 6 is a cross section along the line 6—6 of Figure 1.

Figure 7 is a right-hand end elevation of the machine shown in Figure 1.

Figure 8 is a horizontal section taken on the line 8—8 of Figure 10, with the cover removed and with the writing table and paper sheets partly broken away.

Figure 9 is a section on the line 9—9 of Figure 8, showing the attachment of the carbon-holding clip to the edge of the writing table.

Figure 10 is a vertical section on the line 10—10 of Figure 8, taken immediately inside the outer casing of the apparatus.

Figure 11 is a perspective view of the chassis supporting the internal parts of the autographic register, showing certain related parts in dotted lines.

Referring to the drawings in detail, Figures 1, 2 and 7 show the autographic register of this invention as consisting of a casing, generally designated 10, having side walls 11 and 12 and a bottom wall 13. The bottom wall 13 is extended upwardly at one end of the register to form the front end wall 14. The rear end is closed by a hinged door 15, arranged upon a hinge shaft 16 mounted in the side walls 11 and 12 of the register. The bottom wall 13 is provided with projecting portions 17, serving as legs upon which the register is supported. A cover, generally designated 18, cooperates with the casing 10 to form a closure for the upper surface of the register. The rearward edge of the cover 18 rests upon an offset portion 19 on the upper edge of the door member 15.

At its forward end the cover 18 is provided with a pair of downwardly projecting ears 20, having holes 21 therein (Figure 10), through which passes a cross shaft 22 supported in a manner hereinafter to be described. The cover 18 is likewise provided with a projection 23 at its rearward edge so as to permit the finger nail to be placed thereunder in order to raise the cover. The cover 18 is likewise provided with an aperture 24, whereby the upper surface of the paper which the register employs is exposed, as shown in Figure 1. Near its forward end the cover 18 is likewise provided with an upwardly projecting portion 25, which serves to protect mechanism hereinafter to be described, for holding the paper in its proper position. An angle member 26, secured to the under surface of the cover 18 near its rearward edge (Figures 3 and 4), as by spot welding, serves as a closure to prevent the paper webs, generally designated 27, from falling out of the register when the latter is placed in a vertical position. The paper webs 27 are arranged in zigzag, folded form in a pack, in such a manner that as the free ends of the webs are withdrawn the pack unfolds itself.

Arranged within the casing 10 and beneath the cover 18 is a chassis, generally designated 30 (Figure 10), consisting of a base plate 31 having upwardly bent portions 32, 33 and 34 near its rearward edge. Near the middle of this chassis 30 is a downwardly bent portion 35, which is bent under, as at 36, (Figures 5 and 6) and secured to the bottom 13 of the casing 10 by means of the bolts 37. The chassis 30 forwardly of the downwardly bent portion 35 is provided with additional upwardly bent portions 38, 39, 40 and 41 (Figure 10) in the order named, and likewise with downwardly bent portions 42 serving as legs resting upon the bottom 13 of the register.

The upwardly bent members 32 and 40 are provided with inwardly extending studs 43 which rest in grooves 44 of clips 45 and 46, riveted to the bottom surface of the writing table, generally designated 47. The clips 45 serve to support the rearward end of the writing table 47, whereas the clips 46 serve not only to support the forward end thereof but also for the reciprocation of the writing table. For this purpose the clips 46 are provided with forwardly and downwardly extending portions 48 which are engaged by arms 49 mounted upon the cross shaft 22, the latter being mounted in the holes 50 of the upwardly extending portions 41. One outer end of the cross shaft 22 is provided with a handle 51 secured thereto. By grasping the handle 51 the operator may turn the shaft 22 and consequently move the arms 49 in such a manner as to engage the portions 48 of the clips 46 to move the writing table 47 in a forward direction.

Secured to the upwardly extending members 33 is a bridge member 52, to the middle of which, as at 53, is secured one end of a coil spring 54 (Figures 3 and 8), the opposite end being secured to a pin 55 attached to the writing table 47. Thus the spring 54 urges the writing table 47 in a rearward direction against the trust of the arms 49 when the operator rotates the shaft 22 to move the writing table 47 in a forward direction.

The upper ends of the upwardly extending portions 34 and 38 of the chassis 30 are bent to form hooks, as at 56, and these rest upon clips 57 secured to the casing walls 11 and 12. Flat springs 58, secured to the inner surfaces of the side walls 11 and 12, as by spot welding, serve as detents to engage the edge flanges 59 of the cover 18.

Rising from the forward end of the base plate 31 of the chassis 30 are two arms 60, having their top ends bent horizontally in alignment with the writing table 47 so as to form, in effect, a continuation thereof when the writing table 47 is in its forward position (Figure 3). Riveted to the upwardly extending portions 41 are the opposite ends of a U-shaped bridge member 61, having a pair of slots 62 (Figures 3 and 4) through which project the downwardly extending ends of spring fingers 63, the upper rearward ends (shown dotted in Figure 8) being held in position by means of a retaining member 64, riveted to the bridge member 61 (Figures 3, 6 and 8). In Figure 8 the bridge member 61 is broken away adjacent the spring fingers 63 so as to show the latter more clearly. The lower ends of the spring fingers 63 are sharply pointed so as to engage the paper webs 27 therebeneath. Cooperating with the pointed spring fingers 63 is a centrally disposed spring finger 65, riveted to the lower surface of the writing table 47 and projecting upwardly through the slot 66 therein. The free end of the spring finger 65 is sharply pointed, similar to spring fingers 63, and similarly engages the paper webs 27, but on the lowermost surface thereof.

The left-hand clip 45, at the rearward edge of the writing table 47, is provided with a bent portion 67 which serves as an end abutment for a carbon strip roller 68, the opposite end of which rests against an arm 69, bent downwardly from the writing table 47 (Figure 8). The carbon strip roller 68 rests upon a shelf 70, bent downwardly and outwardly from the writing table 47 and forming a shelf. A flat spring 71 engages the carbon strip roller 68 and holds it in position, with the free ends of the carbon strips 72 projecting over the left-hand edge of the writing table 47, as shown in Figure 8.

As will be subsequently disclosed, the carbon strips 72 are interleaved between the paper webs 27, and are held against the opposite edge of the writing table by means of the carbon-holding clip 73. One end of the latter is secured to the writing table 47, as by the rivet 74, the opposite end being provided with a bent portion 75 (Figure 9) adapted to spring over the rearward edge of the writing table 47. By grasping the end portion 76 immediately beyond the bent portion 75, the operator may raise the clip 73 and release the carbon strips 72 therebeneath.

In assembling the chassis 30 within the casing 10, access to the bolts 37 is obtained through the holes 82 in the base plate 31 of the chassis.

In the operation of the autographic register of this invention, a zigzag folded pack of paper webs 27 is inserted in the interior of the register by opening the end 15. The paper webs 27 are then threaded through the slot 77 and along the top of the writing table 47 (Figures 3 and 4), the cover 18 being lifted during this operation. The carbon strips 72 are then threaded from the roller 68 transversely between the paper webs 27, and secured by the clip 73. The ends of the paper webs are threaded through the space between the lower spring finger 65 and the upper spring fingers 63, the points of which engage the lower and upper exposed surfaces of the paper webs 27, respectively. The ends of the paper webs emerge between the upper ends of the chassis arms 60 and the cross bar 78 spaced above it. The cover 18 of the apparatus is then replaced and the parts of the register occupy the positions shown in Figure 4. The operator now makes the usual inscriptions upon the paper webs such as, for example, a record of the articles sold to a customer, these inscriptions being recorded in multiple copies upon the paper webs 27 beneath carbon strips 72.

After the writing has been completed the operator grasps the handle 51 and rotates the shaft 22 in a clockwise direction. Upon this occurrence the arms 49 engage the downwardly extending portions 48 and force the table 47 to move forward against the thrust of the coil spring 54. Because of the engagement of the point of the spring finger 65 against the lower surface of the lowermost paper web 27, the paper webs are moved forwardly so that the forward edge is exposed by any desired amount, say one-half an inch. Meanwhile, the upwardly extending arms 33 and 39 of the chassis 30 engage the opposite side of the paper web assembly and prevent the latter from slipping while the table 47 moves forward. As the spring fingers 63 are arranged with their points extending in a forward direction, the paper webs 27 slide thereunder without being hindered in their motion. The parts now occupy the positions shown in Figure 3.

When the extreme limit of the forward motion of the paper webs 27 has been reached, the operator releases the handle 51 and the spring 54 then pulls the table 47 back to its original position, shown in Figure 4. The paper webs 27 are, however, immediately engaged by the points of the spring fingers 63 and are thereby prevented from returning with the table 47. The angled arms 60, arranged beneath the paper webs 27, receive the thrust of the spring fingers 63 and prevent slippage of the paper during the retraction of the table 47. As the spring finger 65 attached to the table 47 is moving backwardly during this operation, it merely slips over the paper web without engaging it, in such a manner as to cause it to move backward. The cross bar 78 receives the thrust of the spring finger 65 with the paper webs 27 therebetween.

When the table is returned to its normal position (Figure 4), the forward edges of the paper webs 27 project from the register by an amount sufficient for the operator to grasp them. This he does, and pulls the paper web assembly out of the register until the end of one set of printed forms is reached. These printed forms are then torn off against the cross bar 78, which acts as a tearing edge, and a new set of paper forms is thus brought into position for writing. Transverse perforations made at intervals along the paper webs 27, and between the different sets of paper forms, assist in the tearing operation.

The rearward edge 79 of the writing table 47, immediately adjacent the slot 77, serves to engage the crease 80 between adjacent forms of the paper webs 27. When the table is in its normal position (Figure 4) the adjacent paper forms are at an acute angle to one another, and are thereby prevented from slipping. When the table is moved forward, however, as shown in Figure 3, the rearward edge of the bridge member 52 bends the lower set of paper forms rearwardly, thus changing this acute angle into the obtuse angle shown in Figure 3, and thereby enabling the crease 80 to pass over the edge 79 and along the top of the table 47 until a new set of paper forms has been drawn into registry.

Meanwhile, the written paper forms which have been torn from the pack, are inserted through the slot 81 in the front 14 of the casing 10, passing into the space between the bottom wall 13 of the casing and the base plate 31 of the chassis. This space serves as a storage space for the written forms until it is desired to remove them by opening the end door 15, after raising the cover 18, in the manner previously described. In its closed position the cover 18 acts as an additional holder for the free edges of the carbon strips 72, the latter emerging between the edge flange 59 and the casing side wall 11. The upper edge of the side wall 11 serves as a tearing edge for the used carbon strips, after which the cover 18 may be raised and fresh carbon strips drawn into position, after releasing the clip 73.

It will be understood that I desire to comprehend within my invention such modifications as come within the scope of the claims and the invention.

Having thus fully described my invention, what I claim as new and desire to secure by Letters Patent, is:

1. In an autographic register, a casing, a table slidably mounted in said casing, a carrier for holding paper webs in said casing, an abutment, a feeder associated with said table on the opposite side of said paper webs from said abutment and cooperating with said abutment to urge said paper webs in the direction of motion of said table, and a detainer with a paper-halting portion associated with said casing to hold said webs in a stationary position during the motion of said table in the opposite direction.

2. In an autographic register, a casing, a table slidably mounted in said casing, a carrier for holding paper webs in said casing, an abutment, a feeder associated with said table on the opposite side of said paper webs from said abutment and cooperating with said abutment to urge said paper webs in the direction of motion of said table, a detainer with a paper-halting portion associated with said casing to hold said webs in a stationary position during the motion of said table in the opposite direction, and means for yieldingly urging said table in said opposite direction.

3. In an autographic register, a casing, a table slidably mounted in said casing, a carrier for holding paper webs in said casing, an abutment, a feeder associated with said table on the opposite side of said paper webs from said abutment and cooperating with said abutment to urge said paper webs in the direction of motion of said table, a detainer with a paper-halting portion associated with said casing to hold said webs in a stationary position during the motion of said table in the opposite direction, means for yieldingly urging said table in said opposite direction, and hand-operated mechanism for moving said table in a forward direction against the urge of said yielding means.

4. In an autographic register, a casing, a carrier in said casing for holding a plurality of paper webs, a movable table adapted to support said paper webs for writing thereon, an abutment, a feeder on said table on the opposite side of said paper webs from said abutment and cooperating with said abutment during the motion of said table in one direction to engage and propel said paper webs and in another direction to disengage and release said paper webs, and a detainer with a paper-halting portion associated with said casing adapted to engage and hold immovable said paper webs during the motion of said table in one direction and to allow said paper webs to move freely during the motion of said table in another direction.

5. In an autographic register, a casing, a carrier in said casing for holding a plurality of paper webs, a movable table adapted to support said paper webs for writing thereon, an abutment member, and a yieldingly urged feeder on said table cooperating with said abutment member to propel said paper webs during the motion of said table in one direction and to release said paper webs during the motion of said table in the opposite direction.

6. In an autographic register, a casing, a carrier in said casing for holding a plurality of paper webs, a movable table adapted to support said paper webs for writing thereon, an abutment member, a yieldingly urged feeder on said table cooperating with said abutment member to propel said paper webs during the motion of said table in one direction and to release said paper webs during the motion of said table in the opposite direction, and a yieldingly urged detainer with a paper-halting portion on said casing adapted to allow said paper webs to slide freely during the propulsion thereof by said yieldingly urged feeder and to hold said webs immovable during the motion of said table in the opposite direction.

7. In an autographic register, a casing, a carrier in said casing for holding a plurality of zigzag folded paper webs, a movable table having and edge thereon adapted to guide said paper webs and to engage the folds thereof, said table being arranged to support said paper webs for writing thereon, an abutment member, and a feeder on said table cooperating with said abutment member during the motion of said table in one direction to engage and propel said paper webs and during the motion of said table in another direction to disengage and release said paper webs.

8. In an autographic register, a casing, a carrier in said casing for holding a plurality of zigzag folded paper webs, a movable table having an edge thereon adapted to guide said paper webs and to engage the folds thereof, said table being arranged to support said paper webs for writing thereon, a feeder on said table adapted during the motion thereof in one direction to engage and propel said paper webs and in another direction to disengage and release said paper webs, and a stationary member adapted to cooperate with said edge to free said folds from engagement therewith during the motion of said table in one direction.

9. In an autographic register, a casing, a carrier in said casing for holding a plurality of paper webs, a movable table adapted to support said paper webs for writing thereon, an abutment member, and a spring-urged pointed feeder on said table cooperating with said abutment member to propel said webs during the motion of said table in one direction and to release said webs during the motion of said table in the opposite direction.

10. In an autographic register, a casing, a carrier in said casing for holding a plurality of paper webs, a movable table adapted to support said paper webs for writing thereon, an abutment member, a spring-urged pointed feeder on said table cooperating with said abutment member to propel said webs during the motion of said table in one direction and to release said webs during the motion of said table in the oppoiste direction, and a spring-urged pointed detainer with a paper-halting portion on said casing adapted to allow said paper webs to slide freely during the propulsion thereof by said spring-urged feeder during the motion of said table in one direction and to hold said webs immovable during the motion of said table in the opposite direction.

WILLIAM C. PFEIFFER.